(12) United States Patent
Haddad

(10) Patent No.: US 12,525,877 B2
(45) Date of Patent: Jan. 13, 2026

(54) STEP-DOWN CONVERTER AND CIRCUIT ARRANGEMENT THEREWITH

(71) Applicant: SEMIKRON ELEKTRONIK GMBH & CO. KG, Nuremberg (DE)

(72) Inventor: Kevork Haddad, Hudson, NH (US)

(73) Assignee: SEMIKRON ELEKTRONIK GMBH & CO. KG, Nuremberg (DE)

(*) Notice: Subject to any disclaimer, the term of this patent is extended or adjusted under 35 U.S.C. 154(b) by 457 days.

(21) Appl. No.: 18/107,476

(22) Filed: Feb. 8, 2023

(65) Prior Publication Data

US 2023/0283177 A1 Sep. 7, 2023

Related U.S. Application Data

(60) Provisional application No. 63/316,682, filed on Mar. 4, 2022.

(51) Int. Cl.
*H02M 3/07* (2006.01)
*C25B 9/65* (2021.01)
*C25B 1/02* (2006.01)

(52) U.S. Cl.
CPC ............ *H02M 3/07* (2013.01); *C25B 9/65* (2021.01); *C25B 1/02* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069
See application file for complete search history.

(56) References Cited

U.S. PATENT DOCUMENTS

2020/0251979 A1* 8/2020 Jin .................. H02M 3/158

* cited by examiner

*Primary Examiner* — Bryan R Perez
(74) *Attorney, Agent, or Firm* — Andrew F. Young, Esq.; NOLTE LACKENBACH SIEGEL

(57) ABSTRACT

A circuit arrangement and a step-down converter have a first and a second input connection, with a first, upper and a second, lower step-down converter element. The first step-down converter element has a first input capacitor, the first capacitor connection of which is connected to the first input connection and the second capacitor connection of which is connected to the second output connection. A first series connection has a first switch and a first diode in parallel with the first input capacitor, and a first coil input of a first coil is connected to the center tap between the first switch and the first diode, the first coil output of said first coil being connected to the first output connection, and wherein the second step-down converter element has a second input capacitor.

15 Claims, 3 Drawing Sheets

STEP-DOWN CONVERTER AND CIRCUIT ARRANGEMENT THEREWITH

CROSS REFERENCE TO RELATED APPLICATIONS

This application relates to and claims priority from U.S. Prov. Ser. No. 63/316,682 filed Mar. 4, 2022, the entire contents of which are incorporated herein fully by reference.

FIGURE SELECTED FOR PUBLICATION

FIG. 1.

BACKGROUND OF THE INVENTION

Field of the Invention

The invention describes a step-down converter having a first and a second input connection, wherein the first input connection is intended to be connected to a first DC voltage input potential, and the second input connection is intended to be connected to a second DC voltage input potential that is lower than the first, and having a first and second output connection, wherein the first output connection is intended to have a first DC voltage output potential and the second output connection is intended to have a second DC voltage output potential that is lower than the first.

Customary, textbook step-down converters having a switch and a series-connected coil in the connection between the first input connection and the first output connection, and having a diode connected between the midpoint between switch and coil and the second input connection, which is additionally connected to the second output connection, have the disadvantage that they have a linear dependency relating to the ratio between the respective potential difference of the input connections and the output connections and the duty cycle with which the switch is switched on and off, cf. FIG. 5.

Aspects and Objects of the Invention

Given knowledge of the prior art, the object of the invention is to present a step-down converter, a circuit arrangement therewith and also a method for operating the step-down converter, which step-down converter does not have the above-mentioned linear relationship and is able to be operated with an advantageous duty cycle, in particular for a high potential difference between the input connections compared with the potential difference across the output connections, wherein the step-down converter has low losses and preferably also produces less interference at the output.

This object is achieved according to the invention by a step-down converter having a first and a second input connection, wherein the first input connection is intended to be connected to a first DC voltage input potential, and the second input connection is intended to be connected to a second DC voltage input potential that is lower than the first, and having a first and second output connection, wherein the first output connection is intended to have a first DC voltage output potential and the second output connection is intended to have a second DC voltage output potential that is lower than the first, consisting of a first, upper and a second, lower step-down converter element, wherein the first step-down converter element has a first input capacitor, the first capacitor connection of which is connected to the first input connection and the second capacitor connection of which is connected to the second output connection, wherein a first series connection comprising a first switch and a first diode is connected in parallel with this first input capacitor, and a first coil input of a first coil is connected to the center tap between the first switch and the first diode, the first coil output of said first coil being connected to the first output connection, and wherein the second step-down converter element has a second input capacitor, the first capacitor connection of which is connected to the first output connection and the second capacitor connection of which is connected to the second input connection, wherein a second series connection comprising a second diode and a second switch is connected in parallel with this second input capacitor, and a second coil input of a second coil is connected to the center tap between the second diode and the second switch, the second coil output of said second coil being connected to the second output connection.

It can be advantageous in this case if the first switch is in the form of a semiconductor switch, in particular in the form of an IGBT with an antiparallel-connected diode or in the form of a MOS-FET. The second switch can likewise be in the form of a semiconductor switch, in particular in the form of an IGBT with an antiparallel-connected diode or in the form of a MOS-FET. Particularly preferably, the two switches are identical.

It is likewise advantageous if the first switch is in the form of a series connection comprising at least two first semiconductor switch elements, and the first diode is in the form of a series connection comprising the same number of first diode elements. It is advantageous in this case if a first intermediate capacitor is connected between respective center taps between adjacent first semiconductor switch elements and adjacent first diode elements.

It is likewise advantageous if the second switch is in the form of a series connection comprising at least two second semiconductor switch elements, and the second diode is in the form of a series connection comprising the same number of second diode elements. It is advantageous in this case if a second intermediate capacitor is connected between respective center taps between adjacent semiconductor switch elements and adjacent diode elements.

It is likewise advantageous in principle if the respective semiconductor switch elements and in particular also the respective diode elements are identical.

Furthermore, it is advantageous in principle if an output capacitor is connected between the first and second output connection.

The above-mentioned object is furthermore achieved according to the invention by a circuit arrangement having a step-down converter according to the invention having a DC voltage source and having a load, wherein the DC voltage source is connected to the first and to the second input connection and wherein the load is connected to the first and second output connection.

It can be advantageous if the load is in the form of an electrolysis apparatus, in particular for producing gaseous hydrogen.

It can likewise be advantageous if the DC voltage source is in the form of a photovoltaic installation.

In addition, it can be advantageous if the DC voltage source is in the form of a rectifier circuit.

The above-mentioned object is lastly likewise achieved by a method for operating a step-down converter as described above, wherein the first switch is operated half a phase length out of phase with the second switch.

It can be particularly advantageous in this case if an output voltage between the output connections is at most 40%, preferably at most 25% and in particular preferably at most 15% of an input voltage between the input connections.

Of course, the features which are respectively referred to in the singular can also be present here multiple times in the circuit arrangement according to the invention or in the step-down converter, unless this is explicitly precluded or precluded per se or is inconsistent with the concept of the invention.

It goes without saying that the different configurations of the invention can be realized individually or in any desired combinations in order to achieve improvements, irrespective of whether said configurations are disclosed in connection with the description of the step-down converter, of the circuit arrangement therewith or of the method. In particular, the features mentioned and explained above and hereinafter can be used not only in the combinations indicated, but also in other combinations or by themselves, without departing from the scope of the present invention.

According to an alternative and adaptive aspect of the present invention, there is provided a circuit arrangement and a step-down converter therefor having a first and a second input connection, consisting of a first, upper and a second, lower step-down converter element, wherein the first step-down converter element has a first input capacitor, the first capacitor connection of which is connected to the first input connection and the second capacitor connection of which is connected to the second output connection, wherein a first series connection has a first switch and a first diode is connected in parallel with this first input capacitor, and a first coil input of a first coil is connected to the center tap between the first switch and the first diode, the first coil output of said first coil being connected to the first output connection, and wherein the second step-down converter element has a second input capacitor, the first capacitor connection of which is connected to the first output connection and the second capacitor connection of which is connected to the second input connection, wherein a second series connection comprising a second diode and a second switch is connected in parallel with this second input capacitor, and a second coil input of a second coil is connected to the center tap between the second diode and the second switch, the second coil output of said second coil being connected to the second output connection.

Further explanations of the invention, advantageous details and features are evident from the following description of the exemplary embodiments of the invention illustrated schematically in FIGS. 1 to 5, or from respective parts thereof.

The above and other aspects, features, objects, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
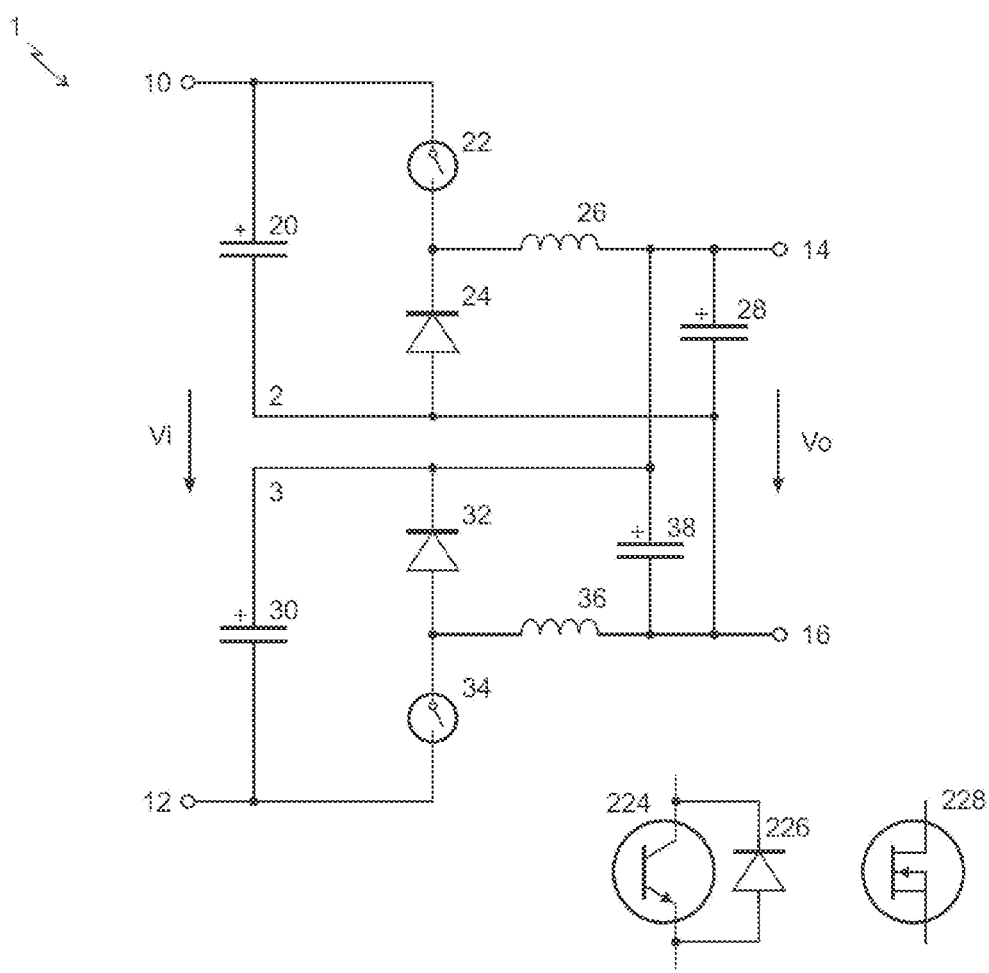
FIG. 1 shows a first configuration of a step-down converter according to the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

FIG. 1 shows a first configuration of a step-down converter 1 according to the invention having a first and a second input connection 10, 12, wherein the first input connection 10, during operation, is intended to be connected to a first DC voltage input potential, and the second input connection 12 is intended to be connected to a second DC voltage input potential that is lower than the first. The step-down converter 1 further has a first and second output connection 14, 16, wherein during operation the first output connection 14 is intended to have a first DC voltage output potential and the second output connection 16 is intended to have a second DC voltage output potential that is lower than the first. According to the requirements, the output potential difference between the first and second DC voltage output potential, that is to say the output voltage, is lower than the input voltage, that is to say than the input potential difference between the first and second DC voltage input potential.

The step-down converter 1 consists of a first, upper and a second, lower step-down converter element 2, 3. In this case, the first step-down converter element 2 has a first input capacitor 20, the first capacitor connection of which is connected to the first input connection 10 and the second capacitor connection of which is connected to the second output connection 16. A first series connection comprising a first switch 22 and a first diode 24 is connected in parallel with this first input capacitor 20. As illustrated, the first switch 22 in this case can be in the form of a bipolar transistor, in particular in the form of a power IGBT, with an antiparallel-connected diode. Alternatively, as illustrated alongside, the first switch 22 can also be in the form of a field-effect transistor, in particular in the form of a power MOS-FET, preferably also with a high band gap.

A first coil input of a first coil 26 is connected to the center tap between the first switch 22 and the first diode 24, the first coil output of said first coil being connected to the first output connection 14.

The second step-down converter element 3 has a second input capacitor 30, the first capacitor connection of which is connected to the first output connection 14 and the second capacitor connection of which is connected to the second input connection 12. A second series connection comprising a second diode 32 and a second switch 34 is connected in parallel with this second input capacitor 30. This second switch is preferably identical to the first switch 22. A second coil input of a second coil 36 is connected to the center tap between the second diode 32 and the second switch 34, the second coil output of said second coil being connected to the second output connection 16.

Two series-connected output capacitors 28, 38 are connected between the first and second output connection 14, 16 here, wherein the first output capacitor 28 is assigned to the first step-down converter element 2, and the second output capacitor 38 is assigned to the second step-down converter element 3.

Figure 2:
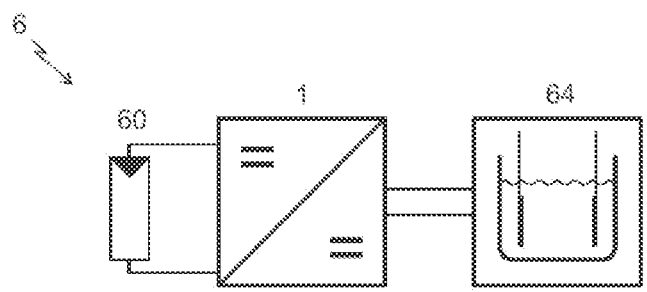
FIG. 2 shows a first configuration of a circuit arrangement according to the invention.

FIG. 2 shows a first configuration of a circuit arrangement 6 according to the invention in a first preferred application. In this case, a DC voltage source 60, here a photovoltaic device, by way of example in the form of a solar field, indirectly or directly supplies power to a step-down converter 1 according to the invention. For this purpose, the higher potential of the photovoltaic device is connected to the first input connection 10 and the lower potential of the photovoltaic device is connected to the second input connection 12 of the step-down converter 1 according to the invention.

The output connections 14, 16 of the step-down converter 1 are connected indirectly or directly to the connections of an electrolysis apparatus 64 in a polarity-conforming manner. This electrolysis apparatus 64 is used to produce gaseous hydrogen here.

Figure 3:
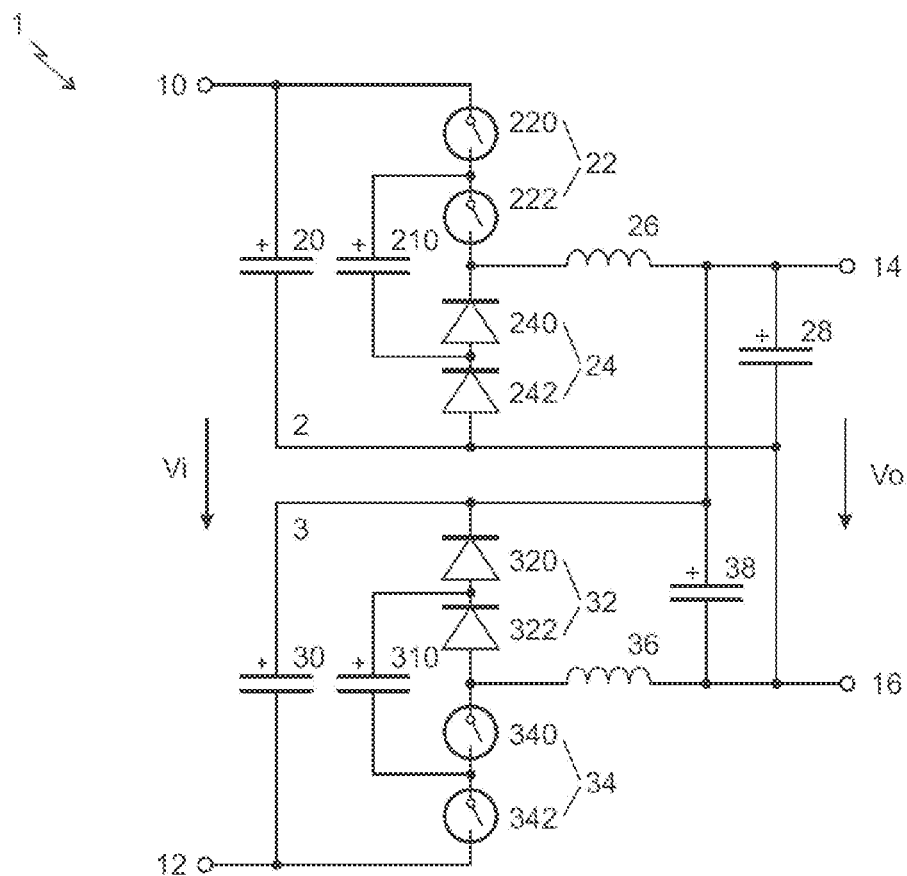
FIG. 3 shows a second configuration of a step-down converter according to the invention.

FIG. 3 shows a second configuration of a step-down converter 1 according to the invention. Basically, in this case, in comparison with the first configuration according to FIG. 1, the first switch 22 is replaced by a series connection comprising two semiconductor switch elements 220, 222. The two first semiconductor switch elements 220, 222 are preferably identical in this case. However, it can also be advantageous for one of the first semiconductor switch elements 220, 222 to be in the form of a bipolar transistor as described above with an antiparallel diode, and for the other semiconductor switch element to be in the form of a MOSFET. Irrespective of the configuration, it is preferred for the two first semiconductor switch elements 220, 222 not to be operated synchronously. By way of example, the two first semiconductor switch elements 220, 222 can be operated out of phase, in particular less than 90° out of phase.

The first diode 24 is furthermore replaced by a series connection comprising two first diode elements 240, 242, here two identical first diode elements. Furthermore, a first intermediate capacitor 210 is connected between the center tap of the two first semiconductor switch elements 220, 222 and the center tap of the two first diode elements 240, 242.

The second switch 34 and the second diode 32 of the second step-down converter element 3 are formed by means of two second semiconductor switch elements 340, 342 and two second diode elements 320, 322 here in an analogous manner to those of the first step-down converter element 2. Furthermore, a second intermediate capacitor 310 is connected in an analogous manner. The respective second semiconductor switch elements 340, 342 are likewise controlled in an analogous manner.

Figure 4:
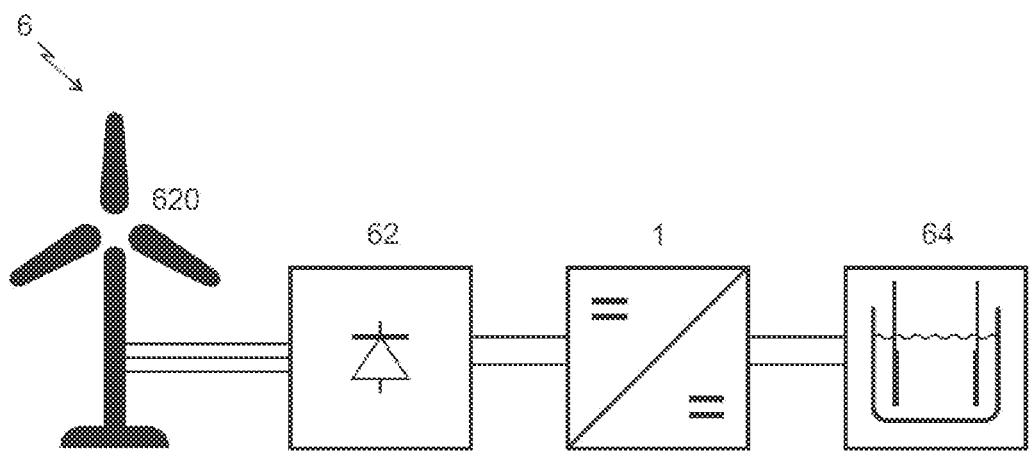
FIG. 4 shows a second configuration of a circuit arrangement according to the invention.

FIG. 4 shows a second configuration of a circuit arrangement 6 according to the invention in a second preferred application. In this case, a wind turbine 620 or a wind farm, more precisely the generator thereof, supplies power to a rectifier device 62 which is connected indirectly or directly to the input connections 10, 12 of a step-down converter 1 according to the invention in a polarity-conforming manner.

The output connections 14, 16 of the step-down converter 1 are in turn connected indirectly or directly to the connections of an electrolysis apparatus 64 in a polarity-conforming manner. This electrolysis apparatus 64 is used to produce gaseous hydrogen here.

Figure 5:
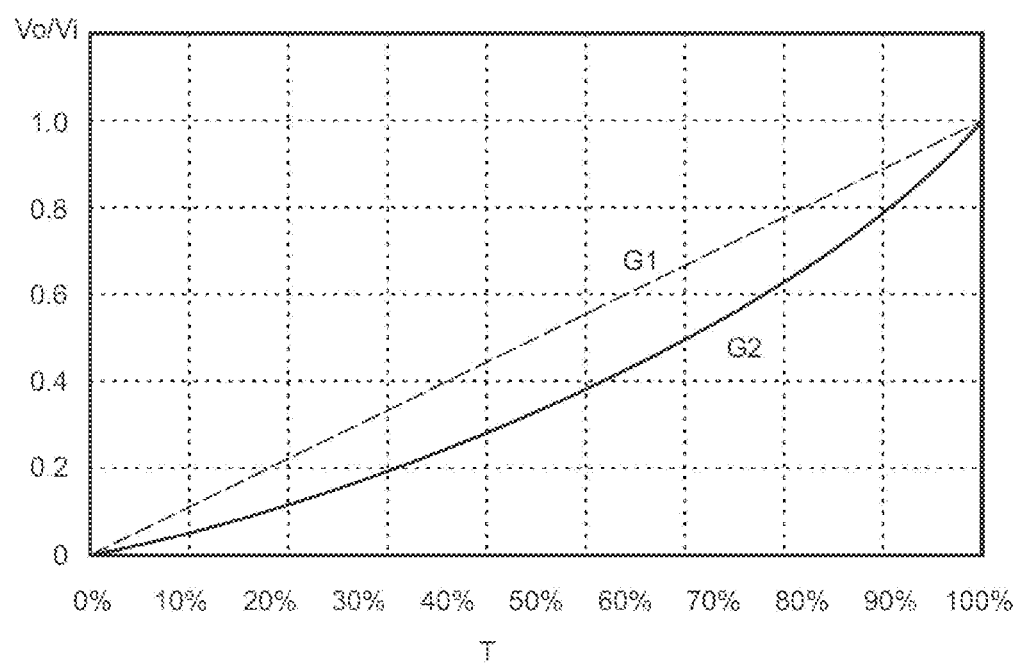
FIG. 5 shows the comparison for the dependency of the ratio of the input potential difference to the output potential difference on the duty cycle relating to the control of the switch of a step-down converter according to the prior art with a step-down converter according to the invention.

FIG. 5 shows the comparison for the dependency of the ratio of the input potential difference to the output potential difference, that is to say the ratio of input voltage Vi to output voltage Vo, during operation on the duty cycle T relating to the control of the switch of a step-down converter according to the prior art with a step-down converter according to the invention.

The duty cycle T, that is to say the ratio of the length of time for which the applicable switch is switched on to the length of time for which the applicable switch is switched off, is plotted on the abscissa here. The resulting ratio Vo/Vi of the average output voltage Vo present across the output connections to the input voltage Vi present across the input connections is plotted on the ordinate.

The dashed, straight line G1 depicts the ratios for a step-down converter according to the prior art as described at the outset.

The second, curved line G2 depicts the ratios for a first switch 22 of a step-down converter 1 according to the invention. Furthermore, the second switch 34 in this case is switched with the same duty cycle as and 180° out of phase with the first switch 22.

The step-down converter 1 according to the invention has the significant advantage over the above-mentioned prior art that it can be operated with a higher duty cycle, in particular in the case of a low ratio Vo/Vi, in particular of below 25%, that is to say of 0.25, that is to say in the case of an output voltage Vo that is lower than the input voltage Vi, as a result of which switching losses are reduced. As a result of both the first and second switches 22, 34 and the semiconductor switch elements 220, 222, 340, 342, if present, being switched out of phase, the output voltage Vo has a more uniform characteristic with fewer ripples.

Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A step-down converter (1), comprising:
  a first and a second input connection (10, 12) wherein the first input connection (10) is intended to be connected to a first DC voltage input potential, and the second input connection (12) is intended to be connected to a second DC voltage input potential that is lower than the first DC voltage input potential;

a first and second output connection (14, 16) wherein the first output connection (14) is intended to have a first DC voltage output potential and the second output connection (16) is intended to have a second DC voltage output potential that is lower than the first DC voltage output potential;

a first, upper and a second, lower step-down converter element (2, 3) wherein the first step-down converter element (2) has a first input capacitor (20), the first capacitor connection which is connected to the first input connection (10) and the second capacitor connection of which is connected to the second output connection (16);

wherein a first series connection, further comprises:
  a first switch (22) and a first diode (24) connected in parallel with the first input capacitor (20);
  a first coil input of a first coil (26) is connected to the center tap between the first switch (22) and the first diode (24)
  the first coil output of said first coil being connected to the first output connection (14);
  the second step-down converter element (3) has a second input capacitor (30); and
  the first capacitor connection is connected to the first output connection (14) and the second capacitor connection is connected to the second input connection (12);

wherein a second series connection, further comprises:
  a second diode (32) and a second switch (34) is connected in parallel with the second input capacitor (30);
  a second coil input of a second coil (36) is connected to the center tap between the second diode (32); and
  the second switch (34) and the second coil output of said second coil being connected to the second output connection (16).

2. The step-down converter, according to claim 1, wherein:
  the first switch (22) is in the form of a semiconductor switch; and
  wherein the semiconductor switch of the first switch (22) is in the form of an IGBT (224) with an antiparallel-connected diode (226) or in the form of a MOS-FET (228).

3. The step-down converter, according to claim 2, wherein:
  the second switch (34) is in the form of a semiconductor switch; and
  wherein the semiconductor switch of the second switch (34) is in the form of an IGBT with an antiparallel-connected diode or in the form of a MOS-FET.

4. The step-down converter, according to claim 1, wherein:
  the first switch (22) is in the form of a series connection, further comprising:
    at least two first semiconductor switch elements (220, 222); and
    the first diode (24) is in the form of a series connection having the same number of first diode elements (240, 242).

5. The step-down converter, according to claim 4, wherein:
  a first intermediate capacitor (210) is connected between respective center taps between adjacent first semiconductor switch elements (220, 222) and adjacent first diode elements (240, 242).

6. The step-down converter, according to claim 5, wherein:
  the second switch (34) is in the form of a series connection having at least two second semiconductor switch elements (340, 342); and
  and the second diode (32) is in the form of a series connection having the same number of second diode elements (320, 322).

7. The step-down converter, according to claim 6, wherein:
  a second intermediate capacitor (310) is connected between respective center taps between adjacent semiconductor switch elements (340, 342) and adjacent diode elements (320, 322).

8. The step-down converter, according to claim 7, wherein:
  an output capacitor (28, 38) is connected between the first and second output connection (14, 16).

9. A circuit arrangement (6), comprising:
  a step-down converter (1) according to claim 1, wherein:
    a DC voltage source (60, 62) has a load (64); and
    the DC voltage source (60, 62) is connected to the first and to the second input connection (10, 12) and the load (64) is connected to the first and second output connection (14, 16).

10. The circuit arrangement, according to claim 9, wherein:
  the load (64) is in the form of an electrolysis apparatus that produces gaseous hydrogen.

11. The circuit arrangement, according to claim 10, wherein:
  the DC voltage source (60) is a photovoltaic installation.

12. The circuit arrangement, according to claim 10, wherein:
  the DC voltage source (62) is in the form of a rectifier circuit.

13. A method for operating a step-down converter (1), according to claim 7, wherein:
  adjacent semiconductor switch elements are controlled out of phase with one another.

14. A method for operating a step-down converter (1), according to claim 1, wherein:
  the first switch (22) is operated half a phase length out of phase with the second switch (34).

15. The method, according to claim 14, wherein:
  an output voltage (Vo) between the output connections (14, 16) is at most 25% of an input voltage (Vi) between the input connections (10, 12).

* * * * *